US012188279B2

(12) United States Patent
Komaromi et al.

(10) Patent No.: US 12,188,279 B2
(45) Date of Patent: Jan. 7, 2025

(54) DETECTION AND MITIGATION SYSTEM RE TAILGATE TO TRAILER HITCH INTERFERENCE

(71) Applicants: Joseph Komaromi, LaHabra Heights, CA (US); Doug Hansel, Mooresville, IN (US)

(72) Inventors: Joseph Komaromi, LaHabra Heights, CA (US); Doug Hansel, Mooresville, IN (US)

( * ) Notice: Subject to any disclaimer, the term of this patent is extended or adjusted under 35 U.S.C. 154(b) by 517 days.

(21) Appl. No.: 17/171,715

(22) Filed: Feb. 9, 2021

(65) Prior Publication Data

US 2022/0251893 A1   Aug. 11, 2022

(51) Int. Cl.
*E05F 15/40* (2015.01)
*B60D 1/62* (2006.01)
*B62D 33/027* (2006.01)
*E05F 15/42* (2015.01)

(52) U.S. Cl.
CPC ............... *E05F 15/40* (2015.01); *B60D 1/62* (2013.01); *B62D 33/0273* (2013.01); *E05F 2015/483* (2015.01); *E05Y 2400/56* (2013.01); *E05Y 2400/57* (2013.01); *E05Y 2900/544* (2013.01); *E05Y 2900/546* (2013.01)

(58) Field of Classification Search
CPC ...... B60D 1/62; B62D 33/0273; B62D 33/03; E05F 15/40; E05F 15/42; E05F 15/43; E05F 15/48; E05F 15/73; E05F 2015/434; E05F 2015/483; E05F 2015/487; E05F 2015/765; E05F 2015/767; E05Y 2400/52; E05Y 2400/53; E05Y 2400/54; E05Y 2400/55; E05Y 2400/56; E05Y 2400/57; E05Y 2800/116; E05Y 2900/544; E05Y 2900/546
See application file for complete search history.

(56) References Cited

U.S. PATENT DOCUMENTS

| 2019/0249479 | A1* | 8/2019 | Lewis | E05B 47/00 |
| 2020/0141171 | A1* | 5/2020 | Ghannam | E05F 15/73 |
| 2021/0070377 | A1* | 3/2021 | Banks, Jr. | B62D 33/0273 |
| 2022/0186541 | A1* | 6/2022 | Adamczyk | E05F 15/40 |

* cited by examiner

*Primary Examiner* — Levi Gannon
(74) *Attorney, Agent, or Firm* — Wells St. John P.S.

(57) ABSTRACT

Disclosed is a detection and mitigation system to detect potential interference conditions of a potential interference condition between a tailgate or rear gate and a component attached to the hitch receiver of the vehicle.

3 Claims, 10 Drawing Sheets

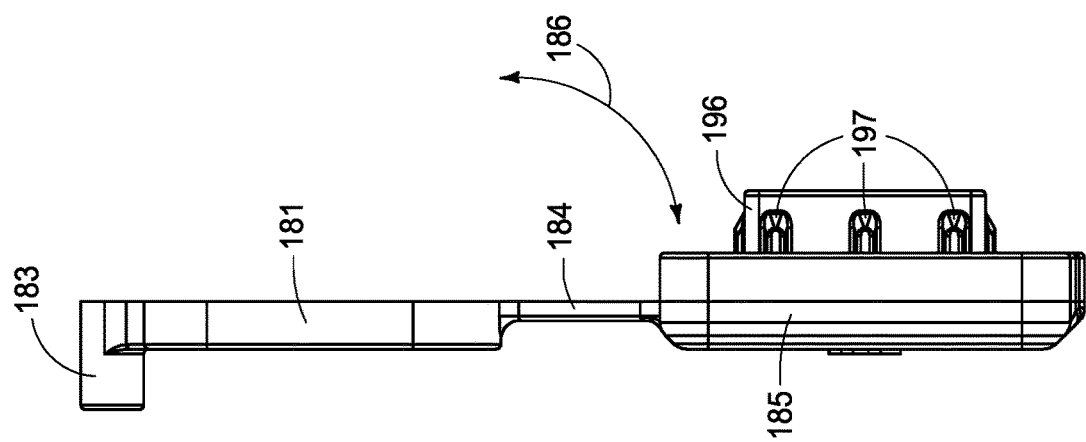
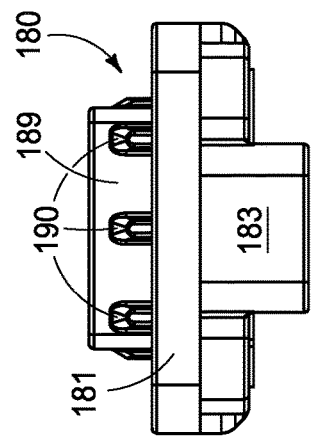
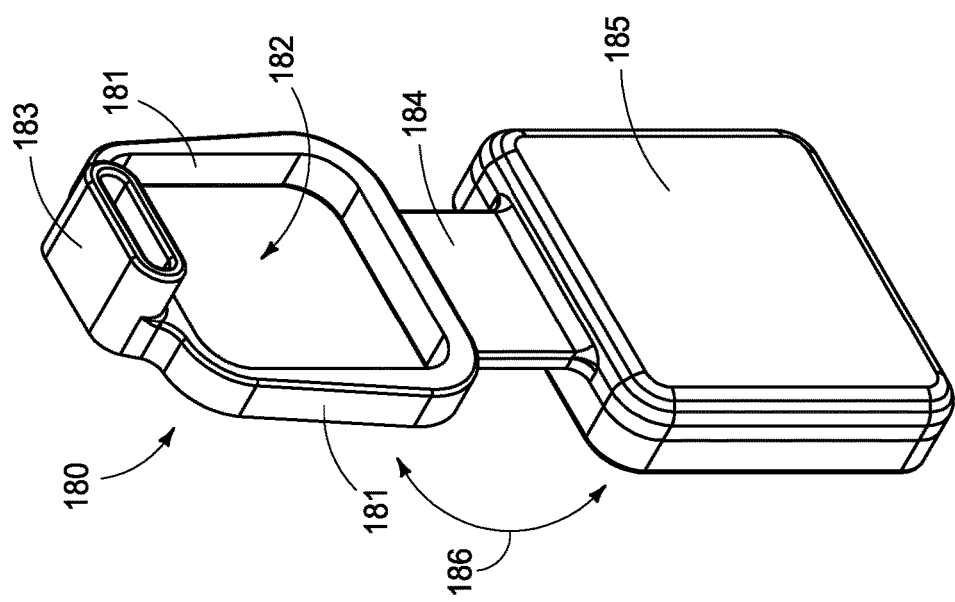
FIG. 8
FIG. 7
FIG. 6

DETECTION AND MITIGATION SYSTEM RE TAILGATE TO TRAILER HITCH INTERFERENCE

CROSS REFERENCE TO RELATED APPLICATION

This application does not claim priority from any other application.

TECHNICAL FIELD

This invention pertains to a system for the detection of an actual or possible interference condition between the tailgate of a pickup truck and a trailer hitch or other component, and the mitigation of said interference.

BACKGROUND OF THE INVENTION

For many years the tailgates of vehicles that are referred to as pickup trucks remained the same, namely a unitary and relatively linear rear end of a pickup that pivoted from an upward position to a downward position (attached or latched to the side walls of the bed of the pickup) generally perpendicular to its original position or parallel to the bed of the pickup truck. For the long existing examples of tailgates, it could be difficult for the user of the pickup truck to climb up into the bed of the pickup to load, unload, move or otherwise work within the bed of the pickup.

In recent years however new tailgate configurations have been developed which provide an easier step-up mechanism which, when the tailgate is in the downward or horizontal position, provides a step up from a lower-than-normal vertical location of the main body of the tailgate. This innovation makes it easier and more convenient for a user to step up onto the tailgate and into the bed of the pickup truck.

Further, the raising and lowering of typical tailgates in newer pickup trucks is automated and eliminates the need for the user to lift or lower the bed—it is all automatic upon the engagement of a switch. The lifting and lower operations may generally be initiated from the cab or passenger area of the pickup or from a position on or near the tailgates themselves. Further typical of some of the newer tailgates is a two-stage opening and closing operation, the one stage being lowering or raising the entire tail unitarily, and the second stage being lowering or raising that smaller step-up portion of the tailgate.

However, with such improvements and new automated designs come detriments. In the case of the additional step-up designs referred to herein, a detriment of the automated lowering process is that when the step-portion is placed into its downward lower position, it may collide, interfere with or otherwise touch components that are directly or indirectly attached in the hitch receiver of the pickup truck. This may include parts of a hitch or hitch ball (depending on its position), or with a trailer or other component mounted to the vehicle via the hitch receiver.

In such a situation when the tailgate of the pickup truck is lowered, especially when the lower step portion of the tailgate is lowered, it may collide or interfere with the hitch, hitch ball or other component that is directly or indirectly attached to the vehicle via the hitch receiver. This will typically result in damage to the tailgate or other components. This is further complicated by the automated lowering and raising of the tailgate of the pickup from within the cab of the pickup, and the result is that numerous pickup tailgates are being damaged because they're being lowered into another component which is directly or indirectly inserted into the hitch receiver.

This invention may also be utilized with the rear gate of a vehicle such as an SUV to detect and mitigate or prevent interference of the rear gate that rises or swings, and a rear storage rack (such as a bicycle or cargo rack) which may be attached to the hitch receiver.

It is therefore an object of some embodiments of this invention to provide a system which detects and then mitigates or prevents the interference of any portion of the tailgate in the lowered position with the components which are directly or indirectly attached to or within the hitch receiver. An advantage of embodiments of this invention is providing such a system which detects the presence of a hitch in the hitch receiver of the pickup, and then alerting the user of the pickup truck and/or mitigating or preventing the interference of the tailgate with the components which are directly or indirectly attached to or within the hitch receiver.

It is a further object of some embodiments of this invention to provide such a system as recited in the preceding paragraph wherein the system is fully integrated into the existing truck control system such that adding additional material components for the detection or mitigation may not be required as existing components of the pickup trucks may be revised or adapted to provide such a system.

It is a further object of some embodiments of this invention to provide such a system as recited above wherein the system is integrated with a traditionally configured trailer hitch cover plug insert and the vehicle control system.

Other objects, features, and advantages of this invention will appear from the specification, claims, and accompanying drawings which form a part hereof. In carrying out the objects of this invention, it is to be understood that its essential features are susceptible to change in design and structural arrangement, with only one practical and preferred embodiment being illustrated in the accompanying drawings, as required.

BRIEF DESCRIPTION OF THE DRAWINGS

Preferred embodiments of the invention are described below with reference to the following accompanying drawings:

FIG. 6 is a perspective view of an example of an embodiment of this invention, namely a detection and mitigation system to mitigate the interference of a hitch component with the tailgate of a pickup truck;

FIG. 7 is a top view of the example of the embodiment of the invention illustrated in FIG. 6;

FIG. 8 is a side view of the example of the embodiment of the invention illustrated in FIG. 6;

DETAILED DESCRIPTION OF THE PREFERRED EMBODIMENTS

Figure 1:
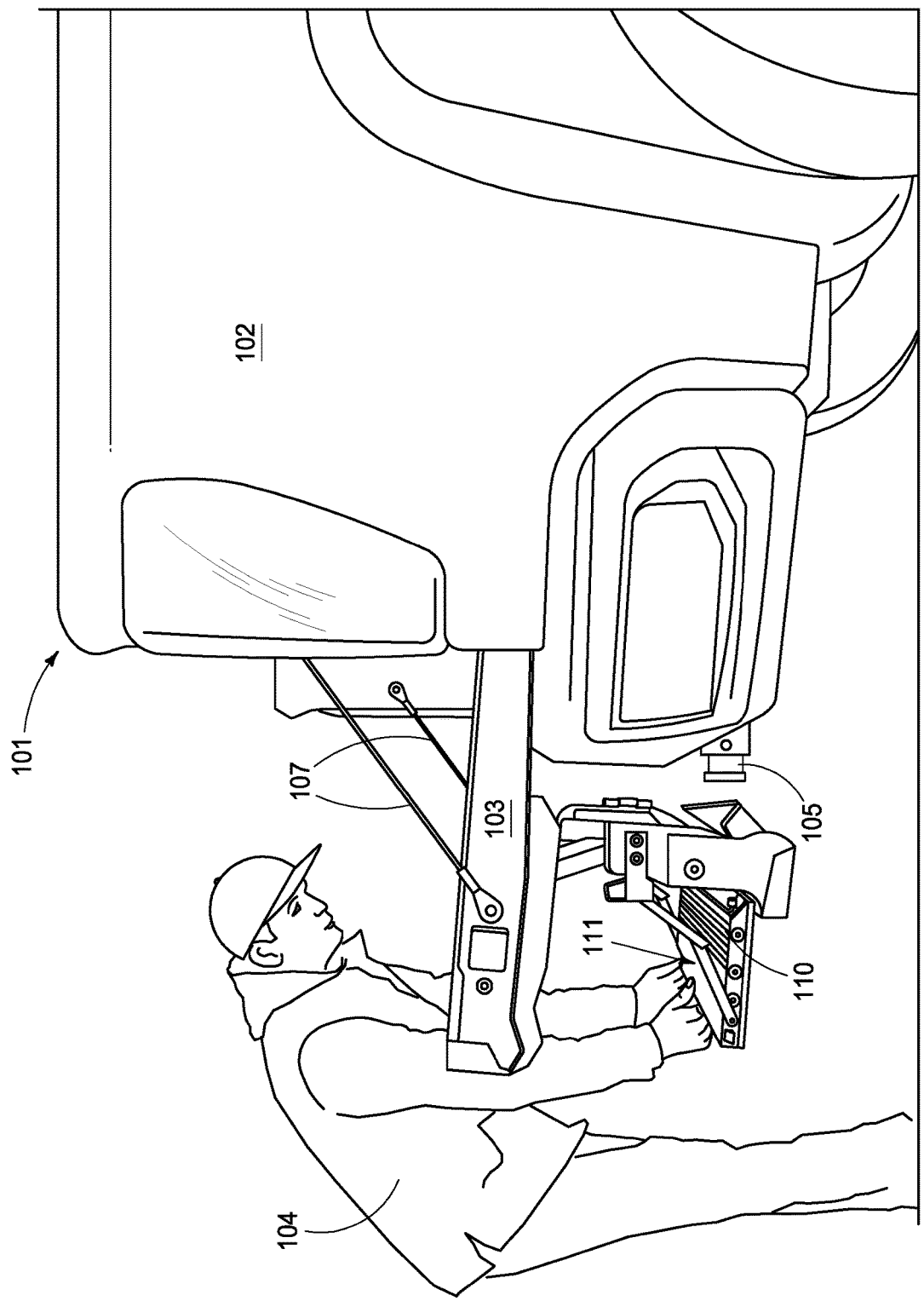
FIG. 1 is a side elevation perspective view of one example of a pickup tailgate with a lowered step configuration mounted on a pickup truck vehicle.

Many of the fastening, connection, manufacturing and other means and components utilized in this invention are widely known and used in the field of the invention described, and their exact nature or type is not necessary for an understanding and use of the invention by a person skilled in the art or science; therefore, they will not be discussed in significant detail. Furthermore, the various components shown or described herein for any specific application of this invention can be varied or altered as anticipated by this invention and the practice of a specific application or embodiment of any element may already be widely known or used in the art or by persons skilled in the art or science; therefore, each will not be discussed in significant detail.

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

It should be noted that when the term detector is used herein, it is meant in a broad sense to include, without limitation, detectors, sensors, optical devices, magnetic devices, electronic devices, radio-frequency based devices, RFID devices, or other device or component which can sense a potential interference related condition. A detector may be independent of, or integral with, a transmitter to communicate or signal to the interference mitigator that a potential interference condition exists, within the contemplation of embodiments of this invention.

It should be noted by those of ordinary skill in the art that embodiments of the system may provide one or more of the following detectors-sensors of actual or potential interference conditions: detection that a trailer hitch is inserted into the hitch receiver; detection that the trailer hitch retention pin is inserted into the hitch receiver; detection that the trailer hitch plug or blocking device has been removed from the internal cavity of the hitch receiver; detecting that the trailer hitch is removed from the hitch receiver; detecting that the trailer hitch retention pin is removed from the hitch receiver; detecting that the trailer hitch plug or blocking device is inserted into the internal cavity of the hitch receiver; detecting optically or visually the presence of components of a hitch or a trailer which may be attached to the vehicle via the hitch receiver; and/or detection through RFID readers and tags of the proximity of trailers, equipment, hitches or hitch balls.

In embodiments of this invention, various detection or sensor methods may be utilized to detect or sense actual or potential interference conditions (may also be referred to as undesirable conditions): one such embodiment may use a contact switch such as a mechanical contacting switch that activates when any of the detection scenarios (or interference conditions) are present; a contactless proximity sensor may be utilized, and this contactless proximity sensor may be utilizing inductive proximity sensors that activate when any of the detection scenarios (or potential interference conditions) are present, using photoelectric proximity sensors that activate when any of the potential interference conditions or detection scenarios are present and/or using ultrasonic proximity sensors that activate when any situation is detected.

This invention may also be utilized with the rear gate of a vehicle such as an SUV to detect and mitigate or prevent interference of the rear gate that rises or swings, and a rear storage rack (such as a bicycle or cargo rack) which may be attached to the hitch receiver. So when the term tailgate is used herein, it would also include a rear type gate on a vehicle other than a pickup truck—such as an SUV with a swing gate, hatchback or lifting gate.

Photosensors may also be utilized in embodiments of this invention, in different positions mounted to the vehicle or hitch receiver, to detect or sense the presence of a potential or actual interference condition.

A detection scenario or interference condition would be a situation where the partial or total lowering of the tailgate would be interfered with by another component such as a hitch, a trailer or other component attached to the vehicle via the hitch receiver.

A still further embodiment of an interference mitigator system as contemplated herein may include the placement of an RFID on the hitch, the hitch ball, the trailer or tongue of the trailer, or on other equipment such as a trailer, such that when it is detected in a pre-determined proximity to the vehicle or the tailgate, the detector-sensor will identify the potential interference, transmit a signal to the interference mitigator, which will in turn prevent the lowering of part or all of the tailgate until the system is overridden or the potential interference condition is abated.

Other and additional detection methods may include using a tilt sensor, an inclinometer to determine when any of the potential interference conditions are present, which may include using accelerometer; using existing ultrasonic sensors provided in the vehicle as an OEM (Original Equipment Manufactured), such as signals from rear facing OEM vision sensors or cameras which determine the presence or absence of one or more potential or actual interference condition.

It will be appreciated by those of ordinary skill in the art that one or more mitigation devices and methods may be utilized to receive transmission of a detection scenario and then provide the mitigation or prevention. These mitigation devices and methods may include intercepting and disallowing inner tailgate release switch signals to reach the body control module if detection scenarios are present; and intercepting and utilizing a controlled eye which can obtain information of the presence of a detection scenario via direct wired connection and or wireless connection such as radiofrequency (RF), Bluetooth, Wi-Fi, etc.

FIG. 1 is a side elevation view of one example of a pickup tailgate with a lowered step configuration mounted on a pickup truck 101. FIG. 1 illustrates the pickup truck 101 with a side panel 102 defining part of the pickup bed, a tailgate 103 in the lowered position and secured by tailgate cables 107. FIG. 1 further shows a user 104 lowering the step or lower portion 110 of the tailgate 103 with the top step surface 111.

FIG. 1 further shows the relative position of the tailgate 103 and the lower step 110 of the tailgate relative to the hitch receiver 105 of the vehicle or pickup truck 101. Those of ordinary skill in the art can see how automatically lowering tailgate, in particular the lower step portion 110 of the tailgate 103, would create an interference condition between the tailgate lower portion 110 and a ball hitch, trailer or other component or mechanism within the receiver hitch 105.

Figure 2:
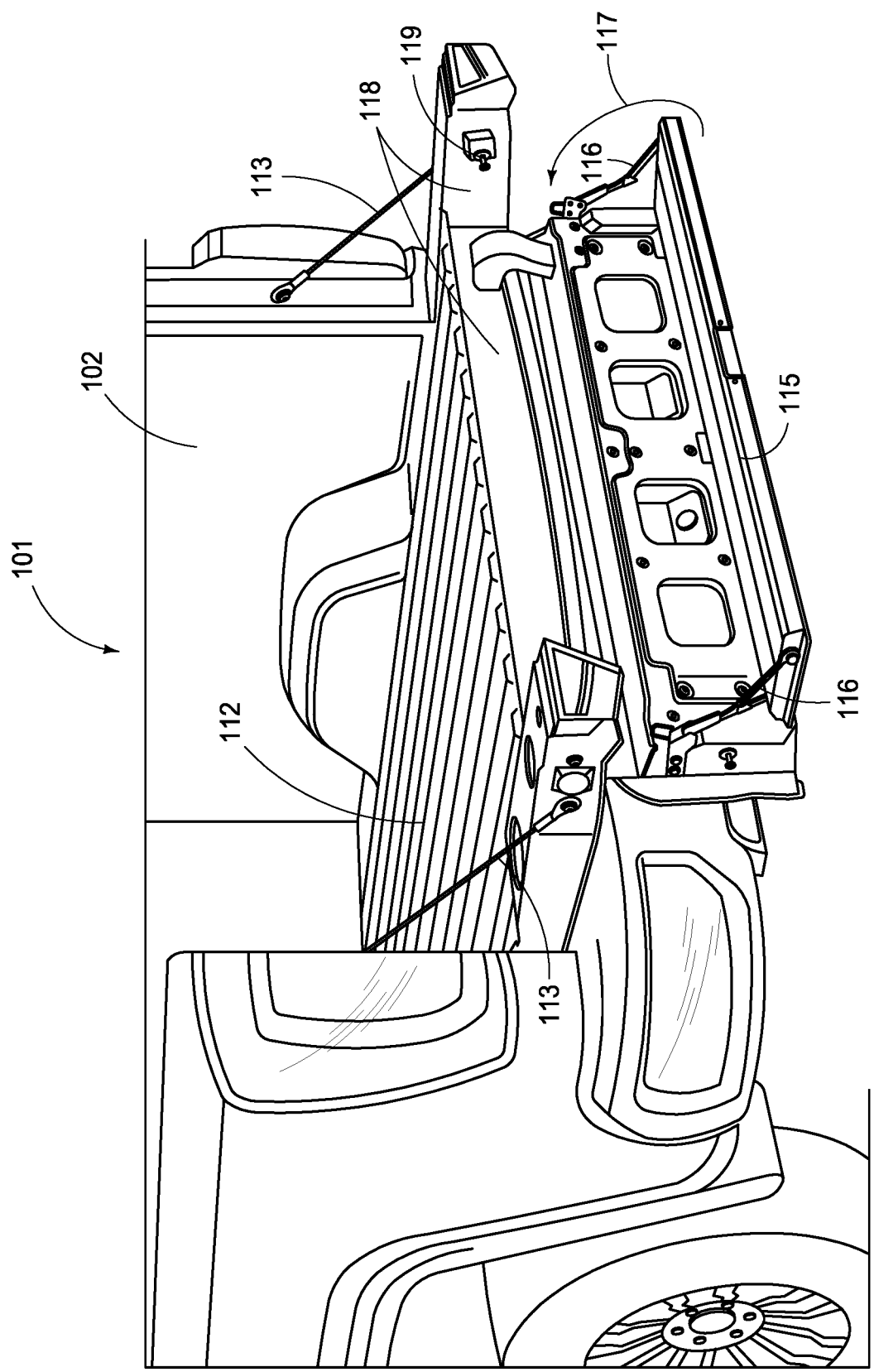
FIG. 2 is an elevation perspective view of the pickup tailgate with the lowered step configuration mounted on the pickup, as shown in FIG. 1.

FIG. 2 is an elevation perspective view of the pickup tailgate with the lowered step configuration mounted on the pickup, as shown in FIG. 1. FIG. 2 illustrates the vehicle as a pickup truck 101, with side panel 102, the bed 112 of the pickup, the tailgate 118 in a lowered position supported by cables 113, as well as the lower step portion 115 of the tailgate which rotates upward and downward as shown by arrow 117. The lower step portion 115 is supported by supports 116 as shown. Latch 119 is shown and provides interlocking latch mechanism to secure or interlock the step portion 115 of the tailgate 118 to the tailgate 118.

Figure 3:
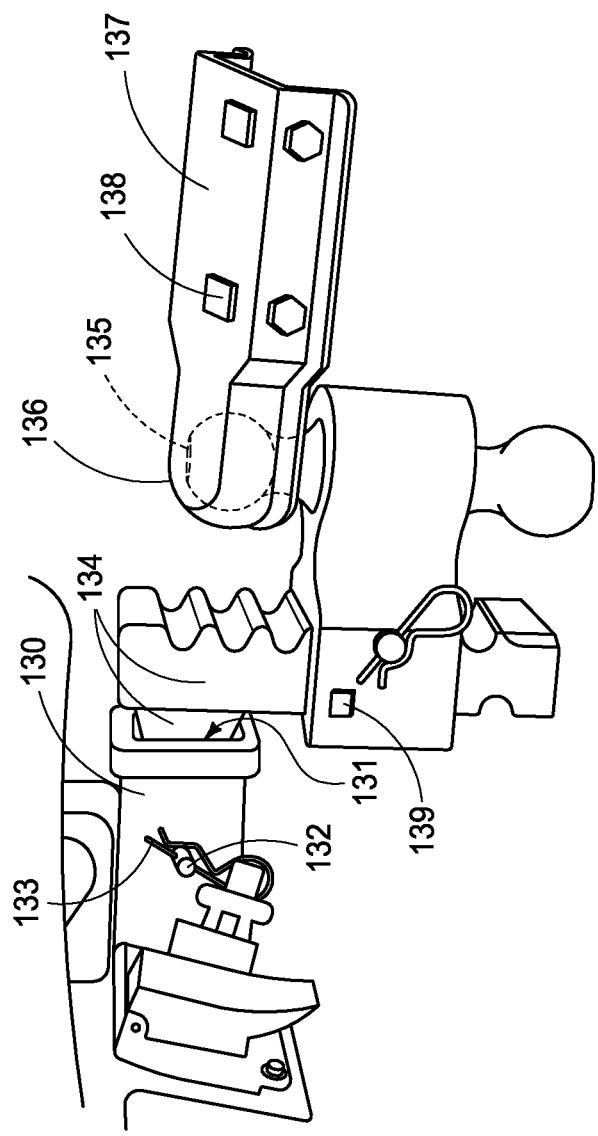
FIG. 3 is a side elevation perspective view of a ball hitch mounted within a hitch receiver of a pickup truck.

FIG. 3 is a side elevation perspective view of a ball hitch 134 mounted within a hitch receiver 130 of a pickup truck. FIG. 3 illustrates how a ball hitch mechanism 134 with a hitch ball 135 may be inserted into the inner cavity 131 of the receiver 130, and secured by a pin 132 and cotter key 133 in the typical way.

FIG. 3 further illustrates another or additional embodiment of an interference mitigator system contemplated by this invention, namely the use of RFID's (radio frequency identification). An RFID chip or tag may be positioned on the hitch, hitch ball or other equipment (such as trailer stem), and then an RFID receiver or reader may be placed on the vehicle and when the RFID reader detects the presence of an RFID chip or tag, it signals to the interference mitigator to prevent the tailgate from being partially or entirely moved into its lower position. FIG. 3 illustrates an RFID transmitter or tag 138 on the stem 137 of a trailer and alternatively an RFID tag 139 mounted on the hitch 134. The RFID receiver or reader may be within the truck's control system (See FIG. 10), or contained within an addition to the tailgate operation system (such as component 251 in FIG. 12), all within the contemplation of embodiments of this invention.

Figure 4:
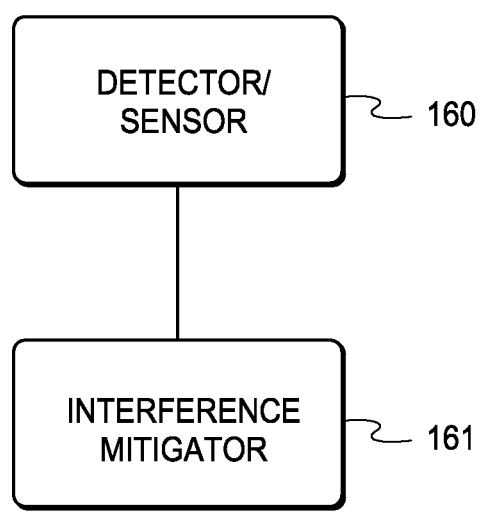
FIG. 4 is a block diagram of one very general example of some of what may be typical components of an embodiment of the system provided by this invention.

FIG. 4 is a block diagram of one very general example of the components of an embodiment of the system provided by this invention, illustrating detector-sensor 160 operably connected to interference mitigator 161.

It should be noted that there are multiple potential types and locations to place one or more detector-sensors, within the contemplation of this invention. Instead of the angle or position detector (accelerometer) in the cap portion of the tailgate plug embodiment, visual, magnetic and/or optical detectors-sensors may also be utilized alone or in various combinations. Examples may, without limitation, include: locating an optical sensor within the internal cavity or outer surface of the hitch receiver so as to detect the presence of a hitch and/or trailer; and/or locating an RFID transmitter directly on the hitch and the presence of the RFID component can be detected by the interference mitigator to prevent the lowering of part or all of the tailgate.

Figure 5:
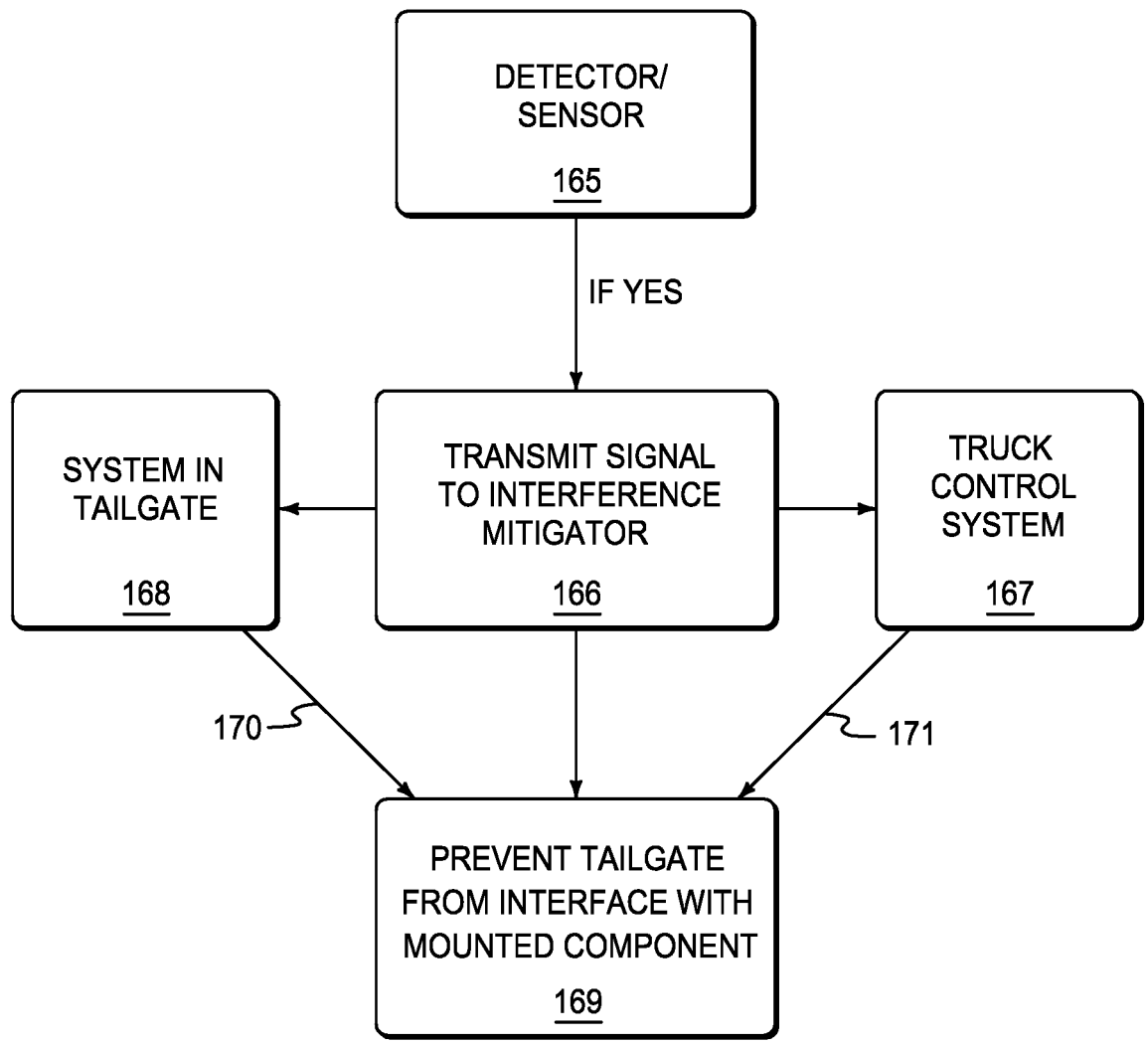
FIG. 5 is a block diagram of one example of a method employed by embodiments of this invention to mitigate or prevent interference of a hitch component attached to a hitch receiver with the tailgate of a pickup truck.

FIG. 5 is a block diagram of one example of a system and/or method employed by embodiments of this invention to mitigate or prevent interference of a hitch component attached to a hitch receiver with the tailgate of a pickup truck. FIG. 5 illustrates that if detector-sensor 165 detects or senses that an actual or potential undesirable condition exists, it transmits a signal to the interference mitigator at step 166. The interference mitigator may be located within the tailgate as shown by step or box 168 or to the truck control system as shown by step or box 167. It should also be noted that the detector-sensor transmits a signal or alarm that a detection scenario exists, that signal may be for an audible alarm and or a signal to activate the mitigator.

If there is a detection of an undesirable condition, then the interference mitigator prevents the tailgate from being lowered to create the interference. Arrow 171 represents an embodiment wherein the truck control system originates the signals to the interference mitigator to prevent the interference. Arrow 170 on the other hand represents an embodiment wherein the system in the tailgate and/or hitch receiver signals the interference mitigator to prevent the interference.

Figure 12:
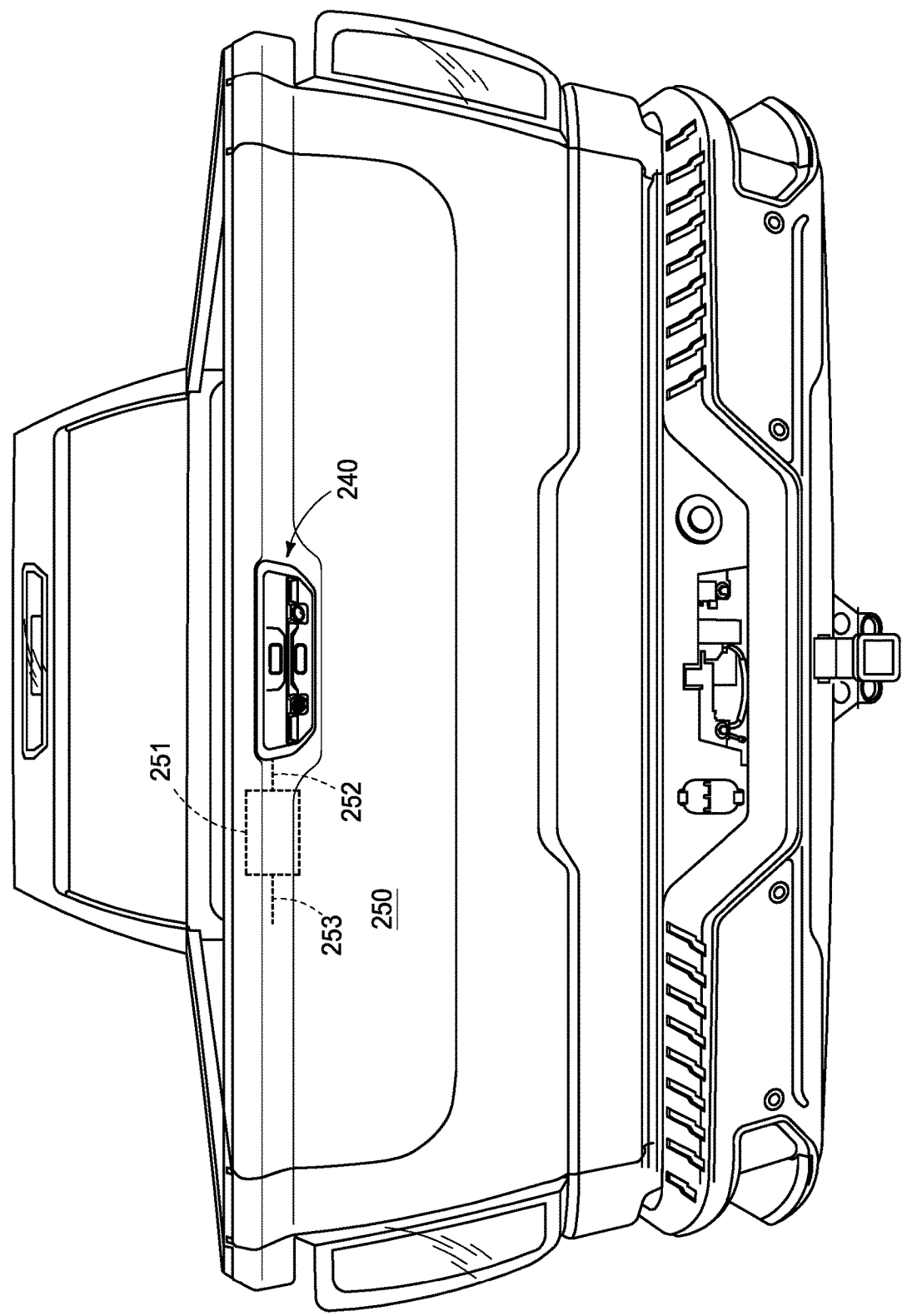
FIG. 12 is an elevation view of an exemplary tailgate of a vehicle showing an embodiment of an interference mitigator within the tailgate.

If the interference mitigator is configured as shown in FIG. 12, then the interference mitigator merely receives a signal from the detector-sensor and thereafter opens the circuit (or blocks or intercepts the initiation of the lowering of the tailgate) thereby preventing the tailgate from being lowered into an undesirable condition.

FIG. 6 is a perspective view of an example of an embodiment of this invention, namely a detection and mitigation system 180 to mitigate the interference of a hitch component with the tailgate of a pickup truck. FIG. 6 illustrates an embodiment of a detection and mitigation system 180, showing cap portion 185, strap or hitch receiver connector portion 181 with hitch receiver aperture 182 and housing 183.

The strap or hitch receiver connection portion 181 would be secured around a hitch receiver which would be inserted into hitch receiver aperture or cavity 182 and secured to the hitch receiver. The flexible bridge portion 184 connects the Portion to the hitch receiver attachment portion and allows for the rotation or pivoting of the cap portion 185 relative to the hitch receiver attachment portion 181, as shown by arrow.

Figure 9:
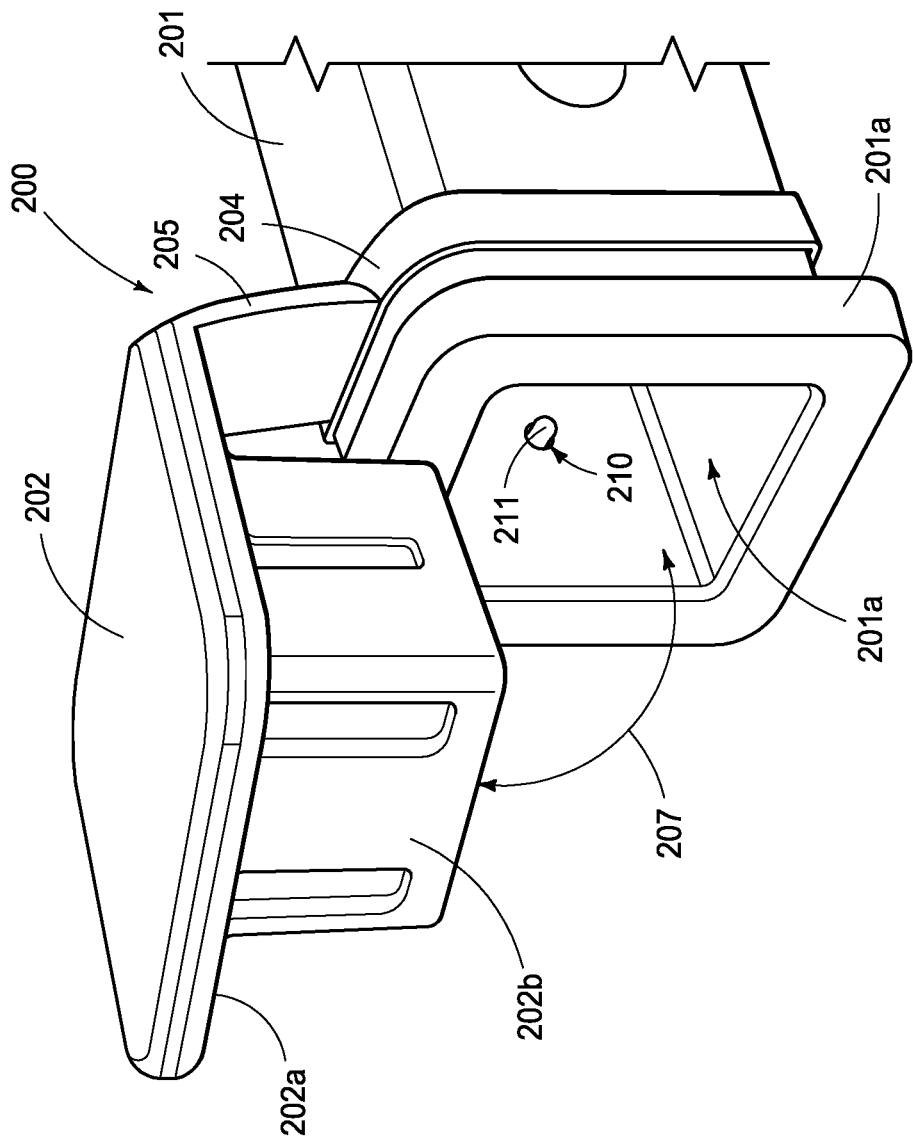
FIG. 9 is a front perspective view illustrating how an embodiment of the invention which is integrated within a typical trailer hitch cover plug insert or hitch cap, may be mounted or positioned relative to the hitch receiver.

In one embodiment of this invention the position or angle detector, such as accelerometer, may be attached to or within cap portion 185 to detect a change in the angle of the cap portion 185, and then to transmit a signal to the interference mitigator. FIG. 9 illustrates an example of one embodiment in which an interference mitigation system 180 may be mounted to a hitch receiver 201.

FIG. 7 is a top view of an example of the embodiment of the detection and mitigation system 180, illustrated in FIG. 6. FIG. 7 illustrates housing 183, plug insert portion 189, hitch receiver connector portion 181 and accelerometer's 190.

FIG. 8 is a side view of the example of the embodiment of the invention illustrated in FIG. 6, illustrating housing 183, hitch receiver attachment portion 181, bridge portion 184, cap portion 185, accelerometers 197, arrow 186 showing relative pivoting or rotation between cap portion 185 and hitch receiver connection portion 181 via flexible bridge portion 184, and plug insert portion 196. The accelerometer configuration would be combined with a transmitter to transmit, communicate or signal to the interference mitigator that a potential or actual interference condition exists. In the embodiment shown in FIG. 8, the transmitter would be contained within the cap-plug portion of the system and would transmit by radio frequency to the interference mitigator.

FIG. 9 is a front perspective view illustrating how an embodiment of the invention which is integrated within a typical trailer hitch cover plug insert or hitch cap 200 may be mounted or positioned relative to the hitch receiver. The hitch cover plug 200 has a plug-cap portion 202, a strap portion 204 and a connector portion 205 which is flexible and connects the plug-cap portion 202 to the strap portion. It will be appreciated by those of ordinary skill in the art that the strap portion may be rigid or flexible so long as it secures the hitch cover plug insert to the receiver hitch 201.

A typical example of an embodiment would include semi flexible strap 204 secure around the hitch receiver 201 with the plug portion being pivotable as shown by arrow 207 to insert the plug portion 202b into the internal cavity 201a of the hitch receiver 201. In the first or lower position wherein the plug portion 202b is inserted into the internal cavity 201a of the hitch receiver 201, the tailgate would be operable and lowerable.

In the second or upper position, as shown in FIG. 9, the position sensor would detect the existence of an actual or possible interference condition (an undesirable condition) and would transmit a signal to the interference mitigator to prevent the tailgate and/or step portion of the tailgate from being lowered.

In one embodiment of this invention an accelerometer may be used as a position or angle detector and located or embedded within portion 202a or the plug portion 202b, and would preferably be battery-powered. The transmission may be by radiofrequency or other known methods and configurations, all as would be known to those of ordinary skill in the art.

FIG. 9 further illustrates another embodiment of the invention wherein a contact switch 211 may be inserted into a contact switch aperture in a side wall (or top or bottom wall) of the hitch receiver. One example would have a rounded head of the contact switch protruding partially into the internal cavity of 201a of the hitch receiver 201 using a biasing means or mechanism so that when a hitch is inserted into the internal cavity 201a of the hitch receiver, the contact switch 211 is forced to retract, which signals to the interference mitigator that an interference condition exists.

Figure 10:
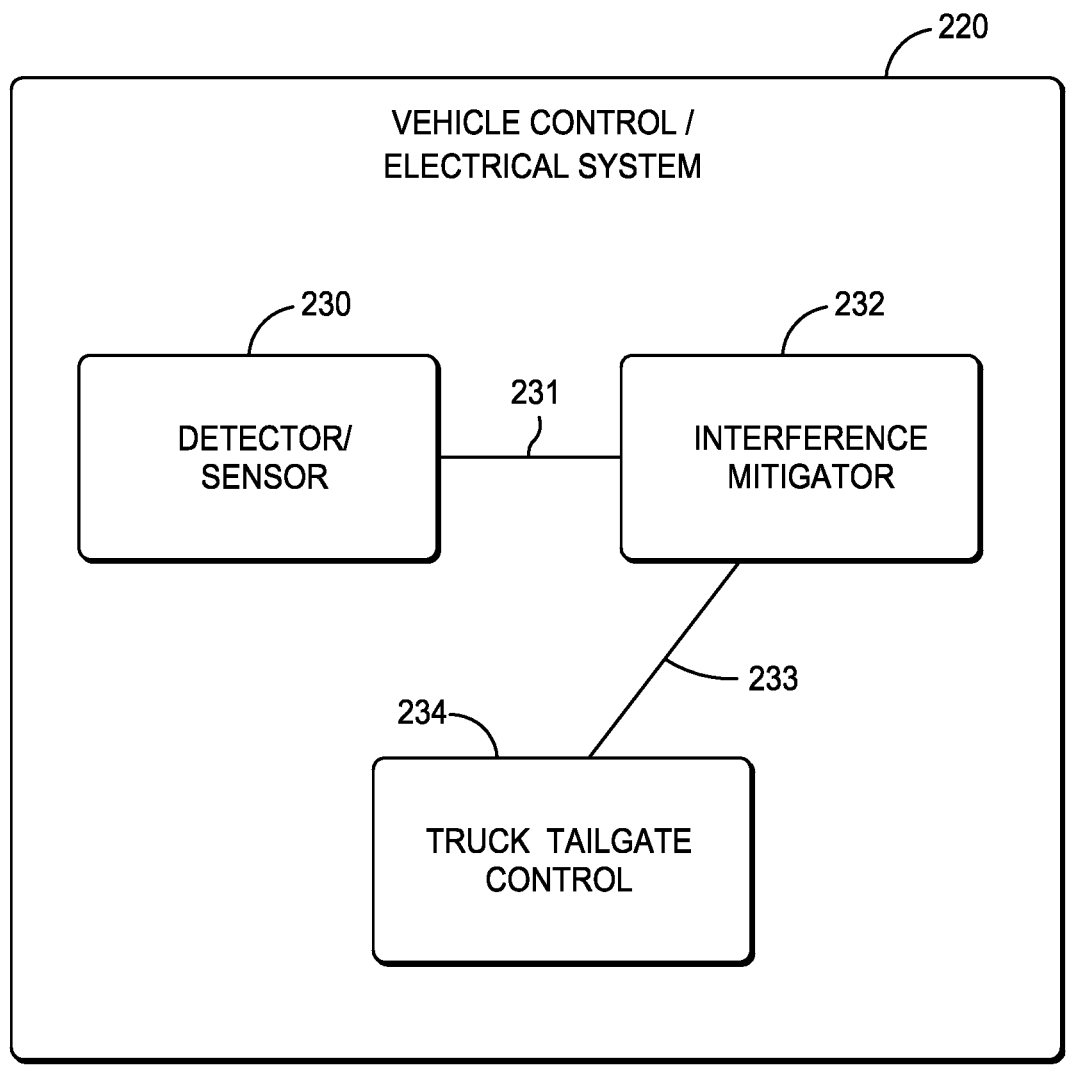
FIG. 10 is a block diagram illustrating an example of an embodiment of an interference mitigation system contemplated by this invention and which is fully integrated into a vehicle control or electrical system.

FIG. 10 is a block diagram illustrating an example of an embodiment of an interference mitigation system contemplated by this invention and which is fully integrated into a vehicle control or electrical system. FIG. 10 illustrates the potential embodiment of the invention wherein existing truck components may be (with certain key additions) utilized to practice the invention. FIG. 10 illustrates how a vehicle control or electrical system 220 may add a circuit component (which would be represented by interference mitigator 232) to for example open the circuit that would otherwise automatically lower both parts of the tailgate, with the circuit component preventing the lowering of the tailgate if an undesirable condition exists.

A rear backup camera for example may also be modified to sense whether an undesirable condition exists such as the presence of a hitch ball and/or trailer, and upon said detection transmitting a signal to the revised interference mitigator 232 to prevent the tailgate from being partially or totally lowered. The tailgate control 234 would typically be located in the cab or interior of the vehicle and operably connected to the interference mitigator at the tailgate via hard wire or wireless connection.

Figure 11:
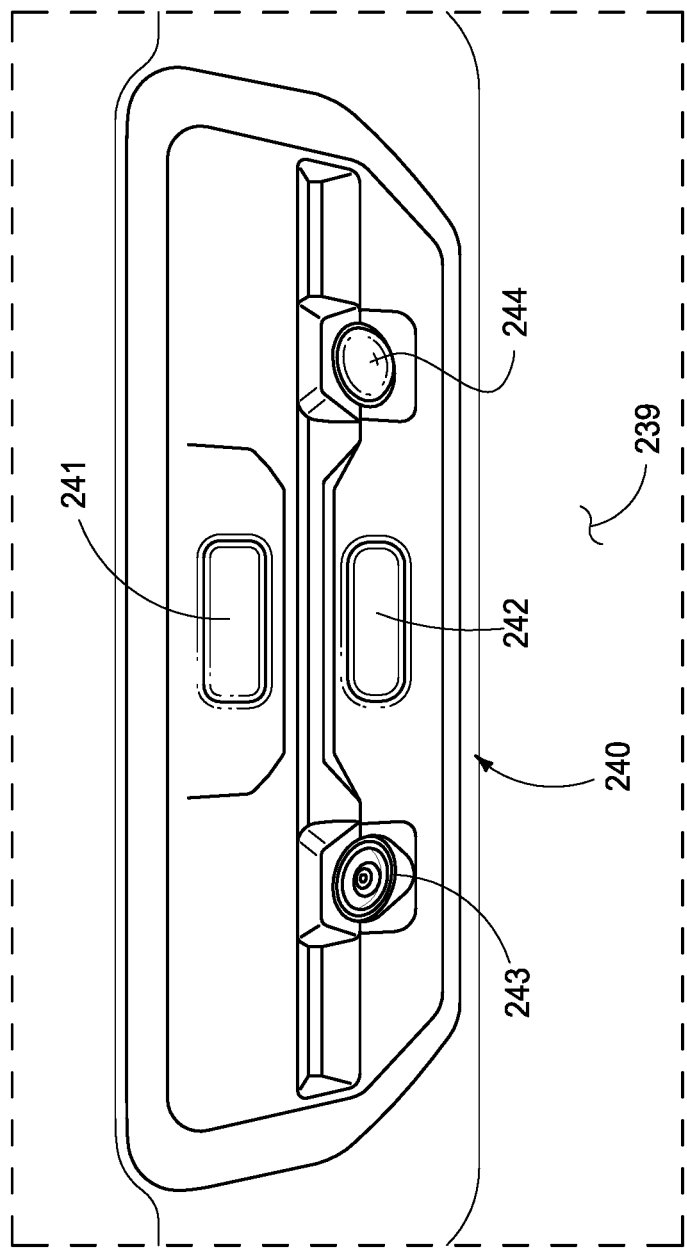
FIG. 11 is an elevation view of an exemplary tailgate control panel located on the tailgate of a pickup truck vehicle.

FIG. 11 is an elevation view of an exemplary tailgate control panel 240 located on the tailgate 239 of the vehicle. While the specific configuration of control buttons and components may vary between different vehicles, this control panel has a tailgate up button 241, a tailgate down button 242, a backup camera 243 and sensor 244. It will be appreciated by those of ordinary skill in the art that variations of the tailgate control panel 240 may be utilized as part of the invention, or used to house or facilitate components of embodiments of this invention.

FIG. 12 is an elevation view of an exemplary tailgate 250 of a vehicle with an embodiment of an interference mitigator 251 within the tailgate 250, in series with the vehicle control system such that the interference mitigator 251 is operably connected to the trucks control system via conductor 253 and operably connected to the vehicle tailgate controller 240 via conductor 252. In such a configuration, the interference mitigator would open the circuit between the vehicle control system and the tailgate controller 240 thereby preventing the tailgate from being lowered when the interference mitigator has received an appropriate signal, which may be from a detector-sensor of an undesirable condition. It will be appreciated that this invention is not limited to the mechanism of opening the circuit to prevent the lowering of the tailgate and other circuitry and other components known in the industry may likewise be utilized.

Embodiments of an interference mitigator 251 which may be used in connection with this invention may include a signal receiver, such as a radio-frequency based receiver, configured to receive signals from the detector-sensor indicating an undesirable condition exists, the interference mitigator 251 thereby opening the circuit and preventing the tailgate from being lowered.

In the case of an embodiment of this invention which integrates with and/or includes a hitch cover tube insert, one example of an interference mitigator 251 may be a position sensor which detects whether the plug portion of the hitch cover tube insert is in the vertical or in the horizontal position, in order to prevent the tailgate from being opened if an undesirable condition exists. Position or angle sensors which may be utilized in embodiments of this invention may include such known devices as an accelerometer within the plug or portion of the hitch receiver insert.

FIG. 12 illustrates an interference mitigator system which utilizes component 251 to intercept a signal to the tailgate or the step portion of the tailgate to lower. Embodiments of interference mitigator component 251 may include a signal receiver (such as radio frequency) or alternatively be hard wired and then a circuit component to open the circuit and prevent the implementation of the lowering of part or all of the tailgate.

It should be noted by those of ordinary skill in the art that the transmission of the signal from the transmitter to the interference mitigator may be in any one of a number of different ways and mechanisms, such as radio frequency, through a hard wire or electrical conductor, and other ways known in the art.

As will be appreciated by those of reasonable skill in the art, there are numerous embodiments to this invention, and variations of elements and components which may be used, all within the scope of this invention. In one embodiment for example, a detection and mitigation system is provided for interference between a vehicle tailgate and a component inserted within the hitch receiver of the vehicle, comprising: a detector configured to detect or sense a potential interference condition; a transmitter operably connected to or integral with the detector, the transmitter being configured to transmit or communicate to a signal receiver integral with an interference mitigator that a potential interference condition exists; and the interference mitigator being further configured to prevent the activation of the lowering of part or all of a tailgate of a vehicle.

In addition to the embodiment disclosed in the preceding paragraph, the invention may be further wherein the alarm signal is an audible signal to alert a user that a potential interference condition has been detected.

In addition to the embodiment disclosed in the second preceding paragraph, the invention may be further wherein the alarm signal is a signal to a control system within the vehicle that the interference condition exists.

In addition to the embodiment disclosed in the third preceding paragraph, the invention may be further wherein the detector is configured to detect a presence of one or more detection conditions: presence of a hitch component inserted in the hitch receiver; presence of a retention pin inserted in the hitch receiver; presence of a hitch plug inserted within the hitch receiver; or presence of a hitch blocking device inserted within the hitch receiver; and/or further wherein the detector which detects an absence of one or more detection conditions, is disposed to detect one or more of: an absence of a hitch component inserted in the hitch receiver; an absence of a retention pin inserted in the hitch receiver; an absence of a hitch plug inserted within the hitch receiver; or an absence of a hitch blocking device inserted within the hitch receiver.

In addition to the embodiment disclosed in the fourth preceding paragraph, the invention may be: further wherein the transmitter transmits to the interference mitigator by radio frequency; further wherein the transmitter transmits to the interference mitigator through an electrical conductor; and/or further comprising a vehicle with a tailgate and a hitch receiver, and wherein the detector is mounted to the hitch receiver and the interference mitigator is mounted within the tailgate and configured to prevent the activation of the lowering of the tailgate.

In another embodiment, a detection and mitigation system is provided for interference between a vehicle tailgate and a component inserted within the hitch receiver of the vehicle, comprising: a detector housing framework including a cap portion, a flexible bridge attached at a first end to the cap portion and at a second end to a receiver attachment portion, such that the receiver attachment portion secures to the housing framework to the receiver such that the cap portion can pivot between a first vertical position covering the internal cavity of the receiver and a second position at an angle offset from the first vertical position; a detector and a transmitter attached to or within the cap portion of the detector housing framework; wherein the transmitter is operably connected to or integral with the detector, the transmitter being configured to send a communication to an interference mitigator indicating that a potential interference condition exists; and further wherein the interference mitigator being mounted within a tailgate of a vehicle electrically in series between a vehicle electrical system and a tailgate lowering activator, and including a signal receiver configured to receive the communication from the transmitter, and further configured to prevent the activation of the lowering of part or all of a tailgate of a vehicle.

In addition to the embodiment disclosed in the preceding paragraph, the invention may further include a detection and mitigation system for interference between a vehicle tailgate and a component inserted within the hitch receiver of the vehicle, and further wherein the receiver attachment portion is a strap configured to be affixed around an outside surface of the receiver and the flexible bridge portion is configured to allow the cap portion to be pivoted to a sufficient angle to allow a hitch to be placed within the internal cavity of the receiver.

In addition to the embodiment disclosed in the second preceding paragraph, the invention may further include a detection and mitigation system for interference between a vehicle tailgate and a component inserted within the hitch receiver of the vehicle as recited in claim 9, and further wherein the detectors comprise accelerometers to detect a change in the angle of the cap portion, and further include a radio frequency transmitter configured to communicate a potential interference condition to the interference mitigator.

In a method embodiment of the invention, a method for detection and mitigation system is provided for interference between a vehicle tailgate and a component inserted within the hitch receiver of the vehicle, comprising: providing a detector configured to detect or sense a potential interference condition; providing a transmitter operably connected to or integral with the detector, the transmitter being configured to transmit or communicate to an interference mitigator that a potential interference condition exists; further wherein the interference mitigator is configured to prevent the activation of the lowering of part or all of a tailgate of a vehicle; detecting a potential interference condition; transmitting that a potential interference condition exists to the interference mitigator; and the interference mitigator then prevents the tailgate from being partially or entirely lowered.

In addition to the embodiment disclosed in the preceding paragraph describing a method embodiment, the invention may further include a method for the detection and mitigation system for interference between a vehicle tailgate and a component inserted within the hitch receiver of the vehicle recited, and further comprising an audible alarm signal upon detecting a potential interference condition.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A detection and mitigation system for interference between a vehicle tailgate or rear gate and a component inserted within a hitch receiver of the vehicle, comprising:
   a detector housing framework including a cap portion, a flexible bridge attached at a first end to the cap portion and at a second end to a receiver attachment portion, such that the receiver attachment portion secures to the housing framework to the receiver such that the cap portion can pivot between a first vertical position covering the internal cavity of the receiver and a second position at an angle offset from the first vertical position;
   a detector and a transmitter attached to or within the cap portion of the detector housing framework;
   wherein the transmitter is operably connected to or integral with the detector, the transmitter being configured to send a communication to an interference mitigator indicating that a potential interference condition exists; and
   the interference mitigator being mounted within a tailgate or rear gate of a vehicle electrically in series between the vehicle electrical system and a tailgate or rear gate lowering activator, and including a signal receiver configured to receive the communication from the transmitter, and further configured to prevent the activation of the lowering of part or all of a tailgate or rear gate of a vehicle.

2. A detection and mitigation system for interference between a vehicle tailgate or rear gate and a component inserted within the hitch receiver of the vehicle as recited in claim 1, and further wherein the receiver attachment portion is a strap configured to be affixed around an outside surface of the receiver and the flexible bridge portion is configured to allow the cap portion to be pivoted to a sufficient angle to allow a hitch to be placed within the internal cavity of the receiver.

3. A detection and mitigation system for interference between a vehicle tailgate or rear gate and a component inserted within the hitch receiver of the vehicle as recited in claim 1, and further wherein the detectors comprise accelerometers to detect a change in the angle of the cap portion, and further include a radio frequency transmitter configured to communicate a potential interference condition to the interference mitigator.

\* \* \* \* \*